Patented Nov. 11, 1930

1,781,672

UNITED STATES PATENT OFFICE

EARL B. WORKING, OF MANHATTAN, KANSAS

CHOCOLATE MATERIAL AND METHOD OF MAKING SAME

No Drawing.    Application filed July 16, 1930. Serial No. 468,463.

The present invention relates to confectionery and in particular has reference to improving chocolate or other material usually containing a large percentage of cocoa butter, including mixtures of chocolate with added cocoa butter, and mixtures of cocoa or chocolate with added fats from other sources, such as are sometimes useful in the confectionery industry, whereby the stability of the resulting product is improved. A great deal of candy of the higher grades, as is well known, carries a coating of chocolate material. The keeping qualities of such chocolate coatings are usually rather poor. Chocolate coatings on candy have a tendency to bloom or become gray, losing their brilliancy or gloss, this tendency being greater at higher temperatures, and this is generally considered in the art to be due to melting or partial melting and movement of the cocoa butter which is a constituent of most chocolate and chocolate preparations. This is commonly referred to in the art as "graying" or blooming of chocolate. As is well known, graying goes on much more rapidly at higher temperatures than at lower atmospheric temperatures. For example high grade chocolate candy displayed in a store window where it is exposed to the sun may turn gray in a couple of hours to such an extent as to be unsaleable as first quality candy.

The present invention is applicable and is especially useful in the case of "chocolate coating" which is in most cases a mixture of chocolate liquor, sugar and added cocoa butter. It is also equally applicable in the case of so-called "compound chocolate coating" which is a mixture of low fat content cocoa with sugar and added fat from other sources, for example, cocoanut butter, to which flavoring material can also be added if desired, which mixtures are widely used at present not only in the candy industry, but as a material for coating biscuits and crackers and similar articles. In all such mixtures the addition of lecithin prevents or materially retards the graying and also prevents other objections as noted below.

Cocoanut butter, as well known, may contain cocoanut oil and hydrogenated cocoanut oil or other hydrogenated oil. The melting point of the cocoanut butter to be used can vary, depending on the temperatures to which the final product is to be subjected. For example, chocolate coating on ice cream (so called "Eskimo Pie") will obviously not need so hard a fat as would chocolate covered candy which is to be kept in a store, unrefrigerated, in the summer time.

As with the high grade chocolate coating masses heretofore commonly used in this art, the mixtures described in the present case can be applied mechanically or by hand dipping. The usual machine for mechanically dipping, heretofore used is called an "enrober".

Depending upon the temperature to which the chocolate coated confection is subjected, graying will ordinarily take place more or less rapidly and especially at temperatures above 90° F. the graying takes place very much more rapidly. On account of this tendency of chocolate coated candies to turn gray, much of the high grade chocolate candy is kept in store-rooms under refrigeration, which of course adds greatly to the cost of handling the material.

My researches have shown that this graying can be to a considerable extent prevented or in other cases can be greatly retarded, by adding to the chocolate a small amount of lecithin, particularly the lecithin obtained from oil-bearing seeds, such as soybean. The lecithin should preferably be sufficiently purified to remove any disagreeable flavors. The entire mass of purified phosphatides can be used, or the lecithin separated from the other phosphatides. The amount of lecithin to be employed can vary between rather wide limits. Ordinarily from 0.1% up to 0.5% is a sufficient amount of lecithin to add for very materially improving chocolate coatings, but in some cases I may run the amount of lecithin up to 1%, or even slightly more than this.

Chocolate coating mass containing about 0.2% of purified soybean lecithin, and made from good quality of chocolate was found to prevent "graying" at temperatures up to 10( 92.5° F., for twelve hours, when the test was discontinued.

Various methods of incorporating the lecithin with the chocolate or chocolate material may be used. As one example, the chocolate liquor may be first melted at a low temperature, say not over 104° F., and the lecithin, also melted at the lowest possible temperature, can be mixed thoroughly by any of the means commonly used in mixing chocolate masses, for example in a chocolate mill or by an electric stirrer. The other components of the mixture are then added and the mixture then made up into the solid form, and treated by well known methods. The manufacturer of the chocolate may if desired, merely add the lecithin to the chocolate liquor, say in a Bramley mill, a roll refiner or conche, in the regular course of manufacture of the chocolate. The lecithin may also be added to various liquid or solid mixtures containing chocolate as the characteristic constituent, which has the effect of stabilizing the mixture with particular reference to its fat (say cocoa butter) content.

"Graying" as the term is commonly used in the confectionery industry and trade, of course, has a specific meaning. The fat content of chocolate coatings, in most cases, consists in large part at least, of cocoa butter, which is a composite fat, composed of different glycerides having different melting points. As the temperature gradually increases, portions of the cocoa butter may soften and melt, and when in a molten state these low melting fractions exude to the surface of the article probably by capillary action. On subsequently cooling, this will harden and solidify on the surface, giving the "graying" of the chocolate, i. e. producing a grayish appearance. This makes the confectionery appear "stale" and interferes with the sale of the product.

In the present invention, this action is prevented or retarded to a considerable extent, by adding a material, lecithin, which binds or blends the fats together, preventing separation of the same from the chocolate mass.

On account of the "graying" of chocolate, the chocolate confectionery business may drop off, in the summer time, to a minor fraction of what it was in the winter, causing a considerable hardship on the industry.

I have referred above to soybean lecithin, but lecithin, in a relatively pure state from other sources can be employed, with satisfactory results, and I do not desire to limit the invention to the use of soybean lecithin. The lecithin produced from buttermilk or dried buttermilk can be satisfactorily used in some instances.

I have also found that when lecithin is employed, the amount of cocoa butter may be substantially reduced, in making up the chocolate mass. Ordinary chocolate mass used for coating, in the prior art, contains around 35% of cocoa butter, or frequently slightly more than this. When using about 0.3% of lecithin, the amount of cocoa butter can be reduced to about 30%. Since cocoa butter is a relatively expensive fat, any substantial reduction in the amount thereof is of commercial importance to the manufacturer.

In accordance with the prior art, the cocoa beans may be first dried and ground in a mill, the material being ground to a very fine smooth paste, containing about 50% or more of cocoa butter. This produces a bitter chocolate mass, ordinarily known in the trade as "chocolate liquor" or "liquor", which is then worked up with a considerable amount of sugar, which of course will reduce the amount of cocoa butter in the sweet chocolate mass, for example down to about 35%.

Ordinarily more sugar is added than this quantity, and an additional amount of cocoa butter is added, to give about 35% or more in the finished sweet chocolate mass. In accordance with the present invention, it is found that if 0.3% of lecithin is added, the amount of cocoa butter to be added can be somewhat reduced, so that the final sweet chocolate mass will contain about 30 instead of 35% of cocoa butter. Such a mass will have about the same viscosity or fluidity, at the temperature at which it is to be applied as a coating to candy, cakes and the like, as the 35% mass heretofore employed.

The above 0.3% of lecithin is around 60% purity, and this accordingly corresponds to approximately 0.2% of actual lecithin.

In the cheaper mixtures containing cocoa and other fats instead of cocoa butter, say cocoanut oil butter, a considerable reduction in the fatty content may also be secured. The reduced fatty content and the presence of lecithin have important advantages in use. With ordinary chocolate mass as heretofore made and used in the confectionery art, the applying of the chocolate mass, that is to say the coating of the cores has to be done at very carefully regulated temperatures, and if the chocolate mass gets as much as 2 or 3° above or below the optimum temperature the coating will be ununiform or will be extremely thick or extremely fragile, in many cases lacking in gloss, on hardening. The use of lecithin in the amounts above indicated will permit the coating to be done at either substantially higher or substantially lower temperatures, in other words the operator does not have to stick so closely to the optimum temperature, in order to get satisfactory results. Another important advantage is that the coating on the candy cores shows a high gloss finish, and gives the candy a more attractive appearance, when the same is placed on sale.

On account of the reduced fat content, and perhaps also on account of the presence of lecithin, the fat in the chocolate coating is more readily digestible, so that a person can eat more candy made by the present process, without getting an uncomfortable "overfull" feeling, or without producing indigestion. Another important feature of the presence of lecithin in the chocolate mass is that whereas moisture thickens the chocolate mass to an undesirable extent, this is largely prevented by the presence of lecithin. This is of considerable importance in the making of "Eskimo Pies" or similar products. In coating ice cream pieces with chocolate mass, small quantities of the ice cream melt into the chocolate mass, or small pieces of the ice cream may break off and become mixed with the chocolate mass, which produces undesired thickening, and any considerable amount of ice cream or other aqueous material getting into the batch of ordinary coating mixture (i. e. without the lecithin added) which the operator is using will necessitate working that mass over for the purpose of getting the water out of it, in order to give satisfactory results. In the presence of such quantities of lecithin as are here referred to, the presence of a small amount of moisture, either from such sources as above indicated or from other sources, does no particular harm, and produces no considerable degree of thickening of the mass. Also in making up chocolate mass with sugar which contains more or less moisture, and also in the manufacture of milk chocolate, this feature is of great importance as considerably simplifying the process.

The high gloss finish above referred to is an important feature, and also the reduction in the fat content aids in preventing graying, even when the candy is stored at relatively high temperatures, for example in store windows in the direct sunshine.

By the term "chocolate" in the appended claims I do not intend to cover cocoa powder as such. Cocoa powder is produced from chocolate liquor or cacao mass by pressing out a considerable portion of the cocoa butter content thereof. Chocolate (and particularly that used for coating, including sweet chocolate) and milk chocolate, contain more fatty material, in proportion to the cacao solids, than does cocoa powder.

By the term "chocolate mass" I mean a mass of material (1) consisting of chocolate liquor (including its normal content of fatty material) with or without added sugar and/or cocoa butter, and/or flavorings, and/or milk solids, or (2) consisting of the "compound chocolate coating" material, above described, which also may contain sugar and/or flavoring materials and/or milk solids.

The term "chocolate" as employed in the trade and by the consuming public is usually understood as not precluding the presence of sugar, flavoring materials, etc.

The term "confectionery" as used herein, is intended to embrace not only candy, but also coated cakes, crackers, "Eskimo Pie" and the like. Such products are of a solid or pasty consistency.

The present application is in part a continuation of my copending application 362,875, filed May 13, 1929.

The addition of the lecithin to chocolate used as a drink has been found also to greatly improve the same.

A mixture of cocoa and treated cocoanut oil, (or other fat or fat mixture of suitable melting point and consistency, such as palm kernel oil, or mixtures of palm oil with other fats) usually with sugar added, produces a very satisfactory cheap product for use in place of real chocolate, for many of the uses of chocolate, and is specifically included under the term "chocolate mass" above.

While I have stressed the use of the chocolate mass containing added lecithin, in coating cores, of various sorts, it is not to be inferred that the invention is restricted to the making of coatings, since the chocolate mass has numerous other uses in the confectionery industry, such as in the manufacture of milk chocolate above referred to, and I do not restrict this invention to use in compositions used for coating cores.

I claim:—

1. A chocolate mass adapted for coating cores of confectionery, comprising chocolate and a small percentage of added lecithin, the percentage of lecithin being sufficient to at least retard "graying."

2. A chocolate mass adapted for coating cores of confectionery, comprising chocolate and a small percentage of added lecithin, the percentage of lecithin being sufficient to enable the fatty constituents of the mass to be reduced below the amounts heretofore commonly employed, while the viscosity and covering power of the mass are still substantially as good as in the masses heretofore commonly used.

3. In the art of making confectionery, the herein described improvement which comprises incorporating, at any stage of the manufacture, with confectionery material including chocolate carrying such amounts of fatty material as to be normally subject to "graying," a sufficient percentage of lecithin to retard "graying."

4. A new material in the confection industry, comprising a chocolate composition suitable for coating candy cores, and containing about 0.1 to 0.5% of lecithin, cores coated with such product being less subject to "graying," at high atmospheric temperature than is ordinary chocolate coating.

5. A chocolate mass having a consistency and melting point suitable for coating confections, containing a small percentage of lecithin, and containing less than the usual content of cocoa butter and similar fats.

6. A chocolate mass having a consistency and melting point suitable for coating candy cores, cakes and the like, containing not substantially over 1% of lecithin, such product having a substantially greater tolerance towards water than has ordinary chocolate coating mass.

7. In making chocolate confections, the step of incorporating with a chocolate coating material which, by itself, applied as a coating would be liable to "graying", an amount of lecithin sufficient to reduce such "graying" tendency and coating confectionery cores with such material.

8. A chocolate coating mass which contains a smaller amount of fat than that normally required for satisfactory dipping, and an amount of lecithin sufficient to impart a sufficient degree of fluidity thereto, to make it satisfactory for application as a coating, by dipping.

9. In making chocolate confections, the herein described step of adding a small amount, not substantially over 1%, of lecithin, to a chocolate mass, the amount of lecithin so added being sufficient to reduce the "graying" tendency.

10. A chocolate confection comprising chocolate containing a small amount, not substantially over 1%, of lecithin, such product having substantially less tendency to "graying" than do similar products containing ordinary chocolate without the lecithin.

11. As a new material in the chocolate confectionery industry, a chocolate mass containing about 0.2% to 0.3% of added lecithin, such lecithin being sufficient to retard "graying", to a substantial extent.

12. In the manufacture of chocolate mass, the steps of reducing the content of cocoa butter and similar fatty material substantially below normal, and adding about 0.2% to 0.3% of lecithin, sufficient to impart to the mixture the necessary workability of the chocolate mass for coating by dipping, whereby the tolerance of the mass to water is substantially improved, and its sensitivity to variation in running temperatures is decreased.

13. In the preparation of chocolate mass, the step of adding, at any stage of the manufacture, about 0.2% to 0.3% of lecithin whereby "graying" of the finished chocolate product is at least retarded.

In testimony whereof I affix my signature.

EARL B. WORKING.